United States Patent [19]
Maxon, III

[11] Patent Number: 5,154,488
[45] Date of Patent: Oct. 13, 1992

[54] DUAL DISCHARGE CHUTE SYSTEM FOR CONCRETE HAULING VEHICLE

[75] Inventor: Glenway W. Maxon, III, Mequon, Wis.

[73] Assignee: Maxon Industries, Inc., Milwaukee, Wis.

[21] Appl. No.: 663,667

[22] Filed: Feb. 28, 1991

[51] Int. Cl.⁵ ............................................. B60P 1/04
[52] U.S. Cl. .......................................... 298/7; 193/5; 193/16
[58] Field of Search ....................... 298/7; 193/5, 6, 16

[56] References Cited

U.S. PATENT DOCUMENTS

| | | | |
|---|---|---|---|
| 2,488,292 | 11/1949 | Hilkemeier | 298/7 |
| 2,880,977 | 4/1959 | Maxon, Jr. | 298/7 X |
| 3,131,913 | 5/1964 | Swarthout | 298/7 X |
| 3,424,498 | 1/1969 | Maxon, Jr. | 298/7 |

Primary Examiner—Michael S. Huppert
Assistant Examiner—Janice Krizek
Attorney, Agent, or Firm—Andrus, Sceales, Starke & Sawall

[57] ABSTRACT

An adjustable high discharge stub chute is mounted on a concrete hauling and discharge vehicle to allow discharge into a hopper or the like which is too high for access by the conventional discharge chute. The high discharge stub chute is hydraulically operated to provide a range of selected discharge positions and a lower inoperative storage position, the latter position being one in which the stub chute is completely out of the path of a conventional discharge chute of the swing-away type.

3 Claims, 2 Drawing Sheets

DUAL DISCHARGE CHUTE SYSTEM FOR CONCRETE HAULING VEHICLE

BACKGROUND OF THE INVENTION

The present invention relates to discharge chute systems for concrete hauling vehicles and, more particularly, to a dual discharge chute system including an adjustable high discharge stub chute.

Various types of vehicles used to haul concrete to a construction site and to discharge the concrete at a selected location are well known in the art. In a conventional truck mixer, a rotatable frustoconical drum with spiral mixing and discharge blades is charged with the ingredients for a batch of concrete or with premixed concrete and travels to the job site with further mixing occurring during transit. At the construction site, reversal of drum rotation causes the concrete to be discharged, most often rearwardly through a small discharge opening in the rear of the drum. A discharge chute is positioned beneath the discharge opening to direct concrete being discharged from the drum to a placement site by swinging the chute laterally about a vertical pivot and/or moving the opposite end of the chute up or down. The vertical position of the discharge opening is limited in height and, because concrete directed onto the discharge chute must slide or flow along it by gravity, there is generally a severe limitation on the effective placement height of the discharge end of the chute. Another problem inherent in the use of truck mixers is the relatively slow discharge capacity because of its dependence on drum rotation alone to effect discharge.

Another type of concrete delivery vehicle utilizes an open top concrete haul body, either with or without mechanical agitation for the concrete, which haul body can be tilted upwardly to discharge the concrete through a rear discharge opening. The haul body is provided with a rearwardly and upwardly tapering construction such that the rear discharge opening is supported in an inherently elevated position. The haul body tilt axis is located immediately below the discharge opening and, by tilting the haul body upwardly, rapid discharge of the concrete may be attained. A discharge chute somewhat like that used in a truck mixer may be used to distribute the concrete dumped from the haul body in a more or less conventional manner. However, the conventional discharge chute is typically made to be removed or mounted to swing away from the rear of the vehicle to a stored position when not in use. Although height restrictions with this apparatus are somewhat less of a problem, the conventional discharge chute nevertheless exhibits some of the same problems posed by the discharge chute of a conventional truck mixer.

An advantage of a tilting haul body vehicle is that it may be backed directly against a concrete receiving device, such as a stationary or movable hopper with a high upper opening edge, and the concrete discharged by dumping directly over the upper edge of the hopper. To facilitate this direct high discharge, it is known to temporarily fasten a fixed position chute to the supporting frame immediately below the discharge opening to bridge the relatively short span between the discharge opening in the haul body and the edge of the hopper. However, such a demountable, fixed position stub chute precludes alternate use of the conventional swing-away chute and, therefore, must be manually detached and stored after use. Because crane-operated and other types of concrete hoppers at job sites may be regularly moved from one location to another, it is often desirable to selectively utilize either the conventional swing-away discharge chute or the short stub chute depending on the location and positioned height of the receiving hopper. It would be most desirable, therefore, to have a high discharge stub chute which could be utilized with a conventional swing-away chute assembly and which was not burdened with the problem of tedious manual mounting and demounting, so that conversion use of from one chute to the other would be easily facilitated.

SUMMARY OF THE INVENTION

In accordance with the present invention, a concrete hauling and dumping vehicle is provided with an adjustable high discharge stub chute providing significant functional improvements over a fixed position manually attachable chute and which can be utilized interchangeably and without manual conversion with a conventional swing-away chute assembly.

The adjustable high discharge stub chute is particularly suitable for use with an open top concrete haul body utilizing tilt discharge. The stub chute includes a chute portion which is movable between an upper position for receiving and directing concrete from the discharge opening in the haul body and a lowermost inoperative position. The stub chute includes means for pivotally mounting the chute portion on a horizontal pivot axis which is parallel to and closely adjacent the tilt axis of the haul body, so that the chute portion can move between the uppermost and lowermost positions. Power means, such as a hydraulic cylinder, interconnect the chute and the vehicle frame to move the chute about its pivot axis and to hold it in any selected pivoted position through its range of movement from its lowermost to its uppermost positions.

In the preferred embodiment, the pivot axis of the chute portion is located coaxially with the tilt axis of the haul body. The coaxial tilt and pivot axes are preferably positioned immediately adjacent the lower edge of the haul body discharge opening and the chute portion includes a generally flat discharge surface which is positioned forward of and out of the way of the lower edge when the chute is in its lowermost position and is directly under the lower edge in any of the selected pivoted positions.

When combined with a conventional swing-away chute system, the high discharge stub chute of the present invention provides an improved dual discharge chute system for a concrete haul body vehicle, but which system may also be utilized on a conventional truck mixer. The main discharge chute is pivotable about a vertical axis between an operative position beneath the discharge opening for receiving concrete and a stored position pivoted laterally away from the discharge opening. The stub chute, mounted as indicated above, is fully operable throughout its range of selected discharge positions and retractable to its inoperative stored position while the swing-away main chute is inoperatively positioned. Conversely, the stub chute may be pivoted downwardly to its lowermost position by retracting the fluid cylinder power means where it is completely out of the way and offers no obstruction to movement of the swing-away chute to its operative position and through its full range of discharge movement.

DETAILED DESCRIPTION OF THE PREFERRED EMBODIMENT

Figure 1:
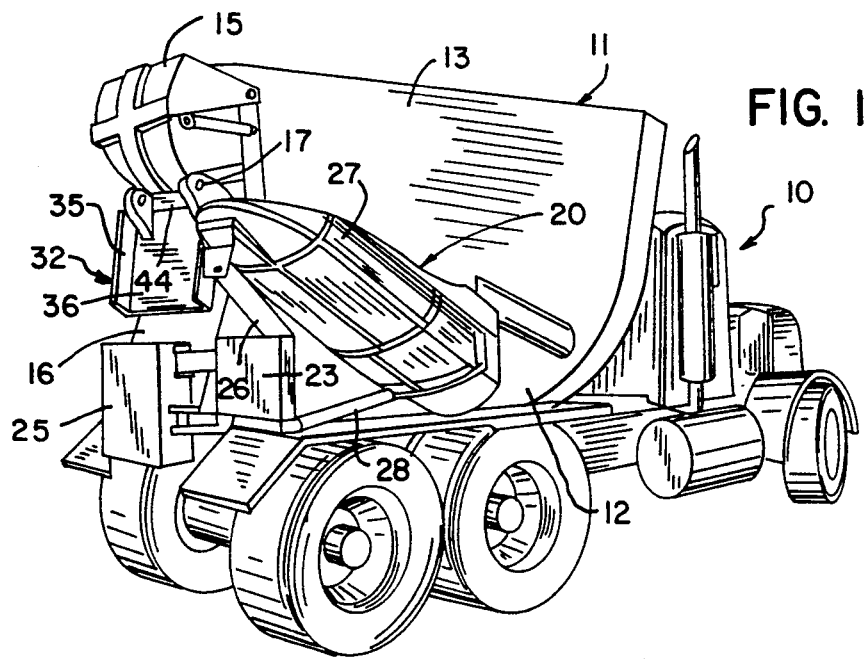
FIG. 1 is a view from the rear and one side of a conventional concrete haul body vehicle utilizing the adjustable high discharge stub chute of the present invention in conjunction with a main swing-away discharge chute.

Referring first to FIG. 1, there is shown a conventional chassis cab vehicle 10 to the rear of which is mounted a haul body 11 of the type conventionally used to carry concrete, but useful in conveying and discharging dry bulk solids as well. The haul body 11 has an open top (not shown) into which premixed concrete is loaded in a conventional manner. The haul body has a frustoconical underside 12 and upwardly extending side panels 13 which taper rearwardly and upwardly to a relatively small discharge opening 14 which is closed by a hydraulically operated gate 15, all in a known manner. The interior of the haul body may include a rotatable agitator mechanism to keep the concrete stirred in transit and prevent segregation. The underside 12 of the body 11 rests on the chassis frame just behind the cab and the rear of the haul body 11 is supported by a generally triangular frame 16 at 10 the rear of the chassis frame. The haul body 11 is attached for upward pivotal movement about a horizontally disposed tilt axis 17 located immediately below the lower edge 18 of the discharge opening 14. A pair of large hydraulic cylinders (not shown) extending between the rear end of the chassis frame and the underside 12 of the haul body are extendable to lift the haul body and pivot the same about its tilt axis 17, simultaneously with the opening of the gate 15, to discharge the concrete. The tilt position is shown in FIG. 4.

Figure 2:
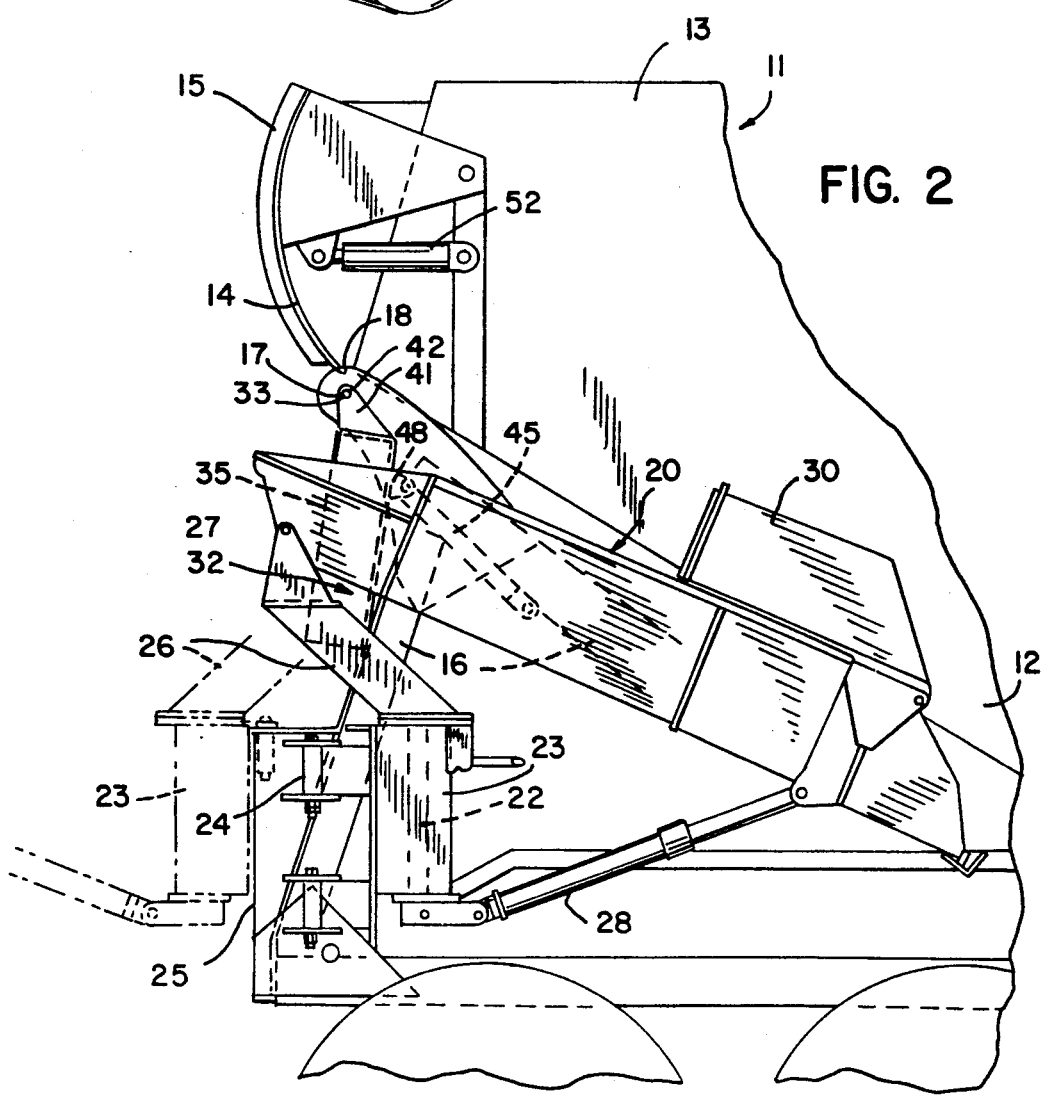
FIG. 2 is a side elevation of the rear of the apparatus shown in FIG. 1 showing details of the dual discharge system, including the adjustable high discharge stub chute.
Figure 3:
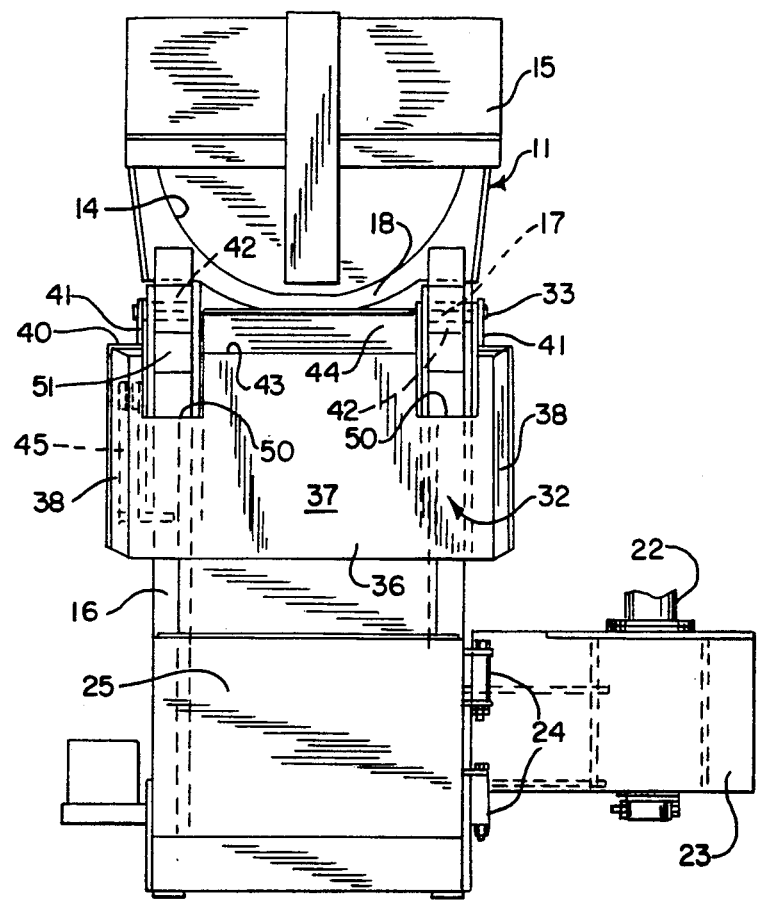
FIG. 3 is a rear elevation of a portion of the apparatus shown in FIG. 2.

Referring also to FIGS. 2 and 3, a swing-away discharge chute 20 is used to receive concrete from the discharge opening 14 and direct it for placement or to an intermediate container, such as a hopper 21, for further transfer to placement. The swing-away chute 20 is mounted on a vertical pivot axis 22 forming an integral part of one vertical edge of a hinge plate 23, the other vertical edge of which is pivotally attached by hinges 24 to the edge of a large bumper plate 25 centrally mounted to the rear of the supporting frame 16. From the upper end of the pivot axis 22, a support arm 26 extends angularly upwardly for supporting attachment to the upper end of a main chute member 27. From the lower end of the pivot axis 22 a hydraulic chute cylinder 28 extends generally horizontally to an attachment to the underside of the lower end of the main chute member 27. The hinge plate 23 is pivotable from its stored position shown in the drawings to an operative position (partly shown in phantom in FIG. 2) with the hinge plate in generally parallel abutting relation to the bumper plate 25 and the upper end of the main chute member 27 disposed directly beneath the discharge opening 14. From this position, the main chute member may be pivoted laterally about the pivot axis 22 and raised or lowered by operation of the chute cylinder 28. A chute extension 30 is hingedly attached to the lower end of the main chute member 27 and can be pivoted downwardly to provide extended placement of concrete, if desired. The swing-away discharge chute assembly 20 is of a construction known in the art.

Figure 4:
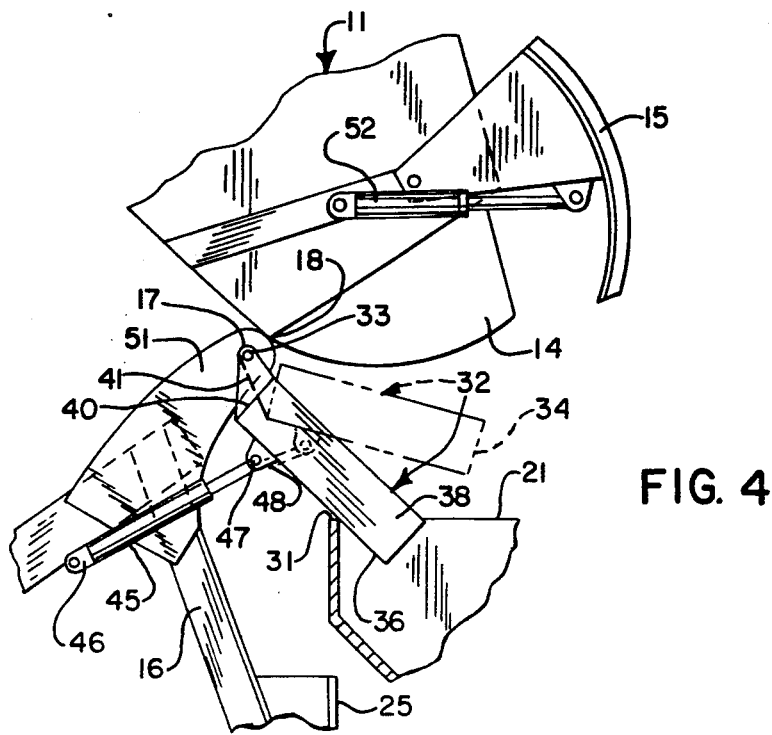
FIG. 4 is a side elevation of a portion of the rear of the apparatus on the side opposite to FIG. 2 showing details of the high discharge stub chute.

As may best be seen in FIG. 4, the upper edge 31 of the hopper 21 into which concrete is to be discharged from the haul body 11 is often positioned at a job site such that it is vertically too high to be reached by the lower edge of the main chute member 27 in its uppermost position with the chute cylinder 28 fully extended. Also, even if the hopper can be accessed with the main chute in its fully raised position, the concrete may not flow adequately by gravity to provide the desired discharge rate. Indeed, with a low slump, dry mix concrete, it may not slide at all along a fully raised chute.

To accommodate the need for a high discharge situation, an adjustable stub chute 32 is pivotally attached to the upper portion of the frame 16 on a horizontal pivot axis 33 for movement between an uppermost discharge position 34 in FIG. 4 and a lowermost inoperative or stored position 35 in FIGS. 1 and 2. The stub chute 32 may be positioned at any selected discharge position between the uppermost and lowermost positions 34 and 35, respectively, to accommodate the height of the upper edge 31 of the hopper 21. The stub chute 32 includes a chute portion 36 having a generally flat discharge surface 37 bounded on its lateral edges by upwardly extending side walls 38. A pair of short forward end walls 40 are attached to the forward edges of the side walls 38 and discharge surface 37. A mounting bracket 41 is attached to each end wall 40 and pivotally attached to the outer end of a main pivot pin 42 forming the tilt axis 17 for the haul body 11. The pivotal attachment of the mounting brackets 41 provides the horizontal pivot axis 33 for the stub chute and thus the horizontal axis 33 is coaxial with the tilt axis 17 of the haul body. The upper forward edge 43 of the stub chute discharge surface 37 is positioned generally below the pivot axis 33. Attached thereto and extending forwardly and upwardly is a short lip 44. In any of its selected operative discharge positions, the forward edge 43 and lip 44 are positioned directly beneath the lower edge 18 of the discharge opening 14 to receive concrete discharged therefrom. However, because of the angled construction of the mounting brackets 41, when the stub chute 32 is pivoted to its lowermost position 35, the entire discharge surface 37 and integral lip 44 are disposed forwardly of the main pivot 42. In this lowermost position 35, the stub chute 32 does not interfere with operative positioning of the swing-away discharge chute 20 when needed.

The stub chute 32 is pivotally operated by a double acting hydraulic stub chute cylinder 45, the cylinder end 46 of which is pivotally attached to the upper portion of the frame 16 and the rod end 47 of which is pivotally attached to a clevis 48 mounted on the underside of the stub chute discharge surface 37. In the fully retracted position of the stub chute cylinder 45, the stub chute is in its lowermost position 35 with its lower edge in engagement with the frame 16. When the stub chute cylinder is fully extended, the stub chute assumes it uppermost discharge position 34 (FIG. 4) in which it is disposed at a downwardly sloping acute angle from the horizontal.

As is best seen in FIG. 3, the forward edge 43 of the discharge surface 37 is provided with two large rectangular notches 50 to provide clearance for the upper ends 51 of the frame 16 adjacent the mounting of the main pivot pins 42. The notches 50 allow unrestricted rotation of the stub chute 32 to its lowermost position.

In operation, and referring particularly to FIG. 4, the stub chute cylinder 45 is fully extended to raise the stub chute to its uppermost position 34. The truck 10 is then backed into position directly against or closely adjacent the hopper 21. It will be appreciated that the upper edge 31 of the hopper in this illustration is much too high to be reached by the conventional swing-away discharge chute 20. With the truck in position, the cylinder 45 is partly retracted to bring the stub chute down into engagement with or closely adjacent the upper edge 31 of the hopper for optimum discharge of concrete into it. The main haul body tilt cylinders are then extended to tilt the haul body II about the main tilt axis 17 and, simultaneously, a pair of oppositely mounted gate cylinders 52 are extended to rotate the gate 15 upwardly to allow concrete to move through the discharge opening 14. High rate discharge is primarily by gravity flow, but may be assisted by rotation of agitators or a screw conveyor within the haul body, if so equipped.

When discharge is complete, the haul body tilt cylinders are retracted to lower the haul body back to its at rest position on the chassis frame and the gate cylinders 52 are retracted to close the gate 15 If the hopper 21 is to be moved away for unloading, as by a cable operated from the boom of a crane, the stub chute cylinder 45 is first fully extended to lift the stub chute 32 to its uppermost position to clear it for movement of the hopper. The stub chute may be held in this upper position until the hopper is returned for another load. When the entire contents of the haul body have been discharged, and the hopper moved away or the truck driven away from the hopper, the stub chute cylinder 45 may be fully retracted, causing the stub chute to return to its lowermost position 35. In this position, the stub chute is oriented nearly vertically downwardly and any concrete remaining in the chute will tend to readily fall therefrom. This self-cleansing action eliminates the need for separate flushing with water.

As previously indicated, when in its lowermost inoperative position 35, the stub chute 32 is completely out of the path of the swing-away discharge chute 20 when it is pivoted into its operative position with the hinge plate 23 abutting the bumper plate 25. Because the stub chute cylinder 45 and the main chute cylinder 28 are only operable exclusively of one another, they may utilize a common source of hydraulic fluid. Thus, utilizing a conventional quick-disconnect hydraulic coupling, a hydraulic fluid supply line may be selectively attached to either cylinder 28 or 45, depending on whether the swing-away chute 20 or stub chute 32 is being utilized. Manual attachment and/or detachment of a conventional prior art fixed position stub chute is eliminated.

The adjustable high discharge stub chute 3 of the present invention and its combination with a conventional swing-away discharge chute 20 adds substantially to the convenience and flexibility of a conventional haul body vehicle. The same benefits provided by the subject invention may be applied to a conventional rotating drum truck mixer with both the stub chute and swing-away chute mounted and operated in essentially the same manner described above.

Various modes of carrying out the present invention are contemplated as being within the scope of the following claims particularly pointing out and distinctly claiming the subject matter which is regarded as the invention.

I claim:

1. A dual discharge chute system for a concrete hauling and discharge vehicle of the type having a rearwardly tapering concrete container terminating in a narrow rear concrete discharge opening, said system comprising:

a main discharge chute pivotable about a vertical axis between an operative position beneath the discharge opening to receive concrete therefrom and a stored position pivoted laterally away from the discharge opening;

a horizontal axis supported directly beneath the discharge opening;

a stub chute mounted to said horizontal axis to pivot between one of several discharge positions in which the stub chute receives concrete directly from said opening when said main chute is in the stored position and an inoperative position, wherein the stub chute is pivoted vertically downwardly and substantially forwardly of said horizontal axis into said inoperative position to provide clearance between said stub chute and the main chute so that said main chute can be pivoted into its operative position; and, power means for moving said stub chute about said horizontal axis and for holding said stub chute in a selected discharge position.

2. The system as set forth in claim 1 wherein the concrete container comprises a haul body whose rear end is pivotally mounted on a horizontal tilt axis, wherein the haul body is pivoted upwardly about the tilt axis for dumping.

3. The system as set forth in claim 2 wherein the horizontal axis of said stub chute and the horizontal tilt axis of the haul body are coaxial.

* * * * *